United States Patent

[11] 3,553,435

[72] Inventor James L. Pike
Sunnyvale, Calif.

[21] Appl. No. 595,925
[22] Filed Nov. 21, 1966
[45] Patented Jan. 5, 1971
[73] Assignee Data Pathing Incorporated
Palo Alto, Calif.
a corporation of California

[54] PHOTOELECTRIC PUNCHED CARD AND DOCUMENT READER

7 Claims, 8 Drawing Figs.

[52] U.S. Cl. .......... 235/61.11, 250/219
[51] Int. Cl. .......... G01n 21/30; G06k 7/10
[50] Field of Search .......... 235/61.11, 61.115, 61.603; 250/219ID, IDC, ICR, 236; 178/7.6; 340/347

[56] References Cited

UNITED STATES PATENTS

| | | | |
|---|---|---|---|
| 3,024,986 | 3/1962 | Strianese et al. | 340/347(4)X |
| 3,055,582 | 9/1962 | Battison et al. | 250/219(ID)X |
| 3,098,152 | 7/1963 | Von Mathes | 340/347(.4)X |
| 3,216,132 | 6/1961 | Flaherty et al. | 235/61.6(03)X |
| 3,221,302 | 11/1965 | Silverberg et al. | 235/61.11(5)X |
| 3,036,765 | 5/1962 | Jones et al. | 235/61.11(5) |
| 3,394,262 | 7/1968 | Kintigh | 250/219(ID) |

OTHER REFERENCES

Croll et al, " Badge and Badge Reader," IBM Technical Disclosure Bulletin, Vol. 2, No. 2, August 1959, p. 30

Rohland, " Multi-Input, Optical Scanning Data Collection Terminal," IBM Technical Disclosure Bulletin, Vol. 8, No. 10, March 1966.

*Primary Examiner*—Maynard R. Wilbur
*Assistant Examiner*—Thomas J. Sloyan
*Attorney*—Flehr, Hohbach, Test, Albritton and Herbert

ABSTRACT: A photoelectric punched card reader includes a rectangular receptacle for receiving a card which is then scanned by a light source and photoresponsive devices supported by a carriage which moves across the stationary card.

INVENTOR
JAMES L. PIKE
BY Fleht, Hohbach, Test, Albritton & Herbert
ATTORNEYS

INVENTOR.
JAMES L. PIKE
BY Fisher, Hohbach, Test Albritton & Herbert
ATTORNEYS

INVENTOR.
JAMES L. PIKE
BY Fleher, Hohbach, Test, Albritton & Herbert
ATTORNEYS

PHOTOELECTRIC PUNCHED CARD AND DOCUMENT READER

This invention relates generally to a photoelectric punched card and document reader.

Data and information have been stored on punched cards and edge punched documents in the form of holes arranged in columns and rows, each possible location representing a bit; a particular pattern of holes in each column representing a character. The number of rows is characteristic of a particular code; for example, seven rows represent a seven bit code.

Punched cards have been read by providing in-line probes for a column, one for each hole position. When a hole is in registry with a probe, the probe extends through the card and completes a circuit associated with that particular probe. This causes a signal to appear in an associated circuit. Thus, the hole pattern for each column is converted to an electrically coded character in the form of signals of parallel wires. These coded characters can then be processed to actuate printers, computers, calculators, or for transfer to other storage means, such as magnetic tape, punched paper tape or the like.

The cards or documents are generally drawn past the sensing or reading station by a feed mechanism. The mechanism may move the cards past the reading station at a continuous rate or step by step to present successive columns to the in-line probes. Cards which are bent, torn or otherwise mutilated increase the likelihood of malfunction of the sensing or feeding apparatus.

In certain instances, the mechanical probes at the reading station have been replaced by photoelectric sensors. Again, the cards or documents must be drawn past the sensing or reading means and malfunction may be caused by damaged, torn or mutilated cards or documents.

In some cases, dexterity is required to properly insert the card or document. Since most devices employ one form or another of friction drives, the cards become worn, and after repeated usage malfunction may result. Further, malfunction may also result because of slippage due to grease, dust, etc., on the surface of the card.

It is an object of the present invention to provide an improved card and document reading apparatus.

It is a further object of the present invention to provide a card and document reader in which a light source and a set of photoresponsive devices are carried on a common carriage for scanning movement with respect to a stationary document or card.

It is still a further object of the present invention to provide a document and card reader adapted to read a variety of punched cards and documents.

It is still a further object of the present invention to provide a card and document reader which can receive and read mutilated and damaged cards.

It is a further object of the present invention to provide a card and document reader in which wear of the card or document is minimized and in which the surface characteristics of the card are not critical.

It is still a further object of the present invention to provide a card and document reader which is simple in construction and inexpensive.

The foregoing and other objects of the invention will become more clearly apparent from the following description taken in conjunction with the accompanying drawing.

Referring to the drawings.

Figure 1:
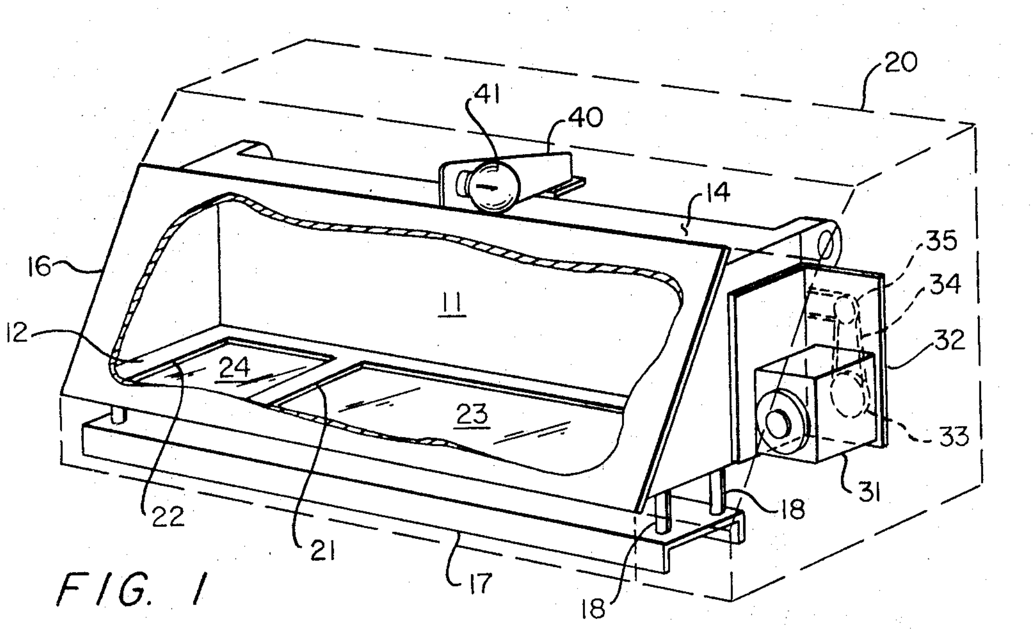
FIG. 1 is a perspective view of a card reader incorporating the present invention.

Referring generally to FIG. 1, the apparatus comprises a cast housing 11 (see also FIG. 4) including a bottom plate 12, a backplate 13 and a top plate 14; these three plates form a C-shaped card cavity which is enclosed by a cover 16 hinged to top plate 14. A U-shaped bracket 17 is spaced from bottom plate 12 by four posts or standoffs 18. In actual practice, the above assembly would be placed in a suitable cabinet 20 as indicated in dashed outline to seal it from the surrounding atmosphere.

Bottom plate 12 includes openings 21 and 22 adapted to receive and position documents placed therein. The edges of the openings serve to accurately position the card or document. Windows 23 and 24 seal the bottom of the openings to support an inserted card or document.

Figure 2:
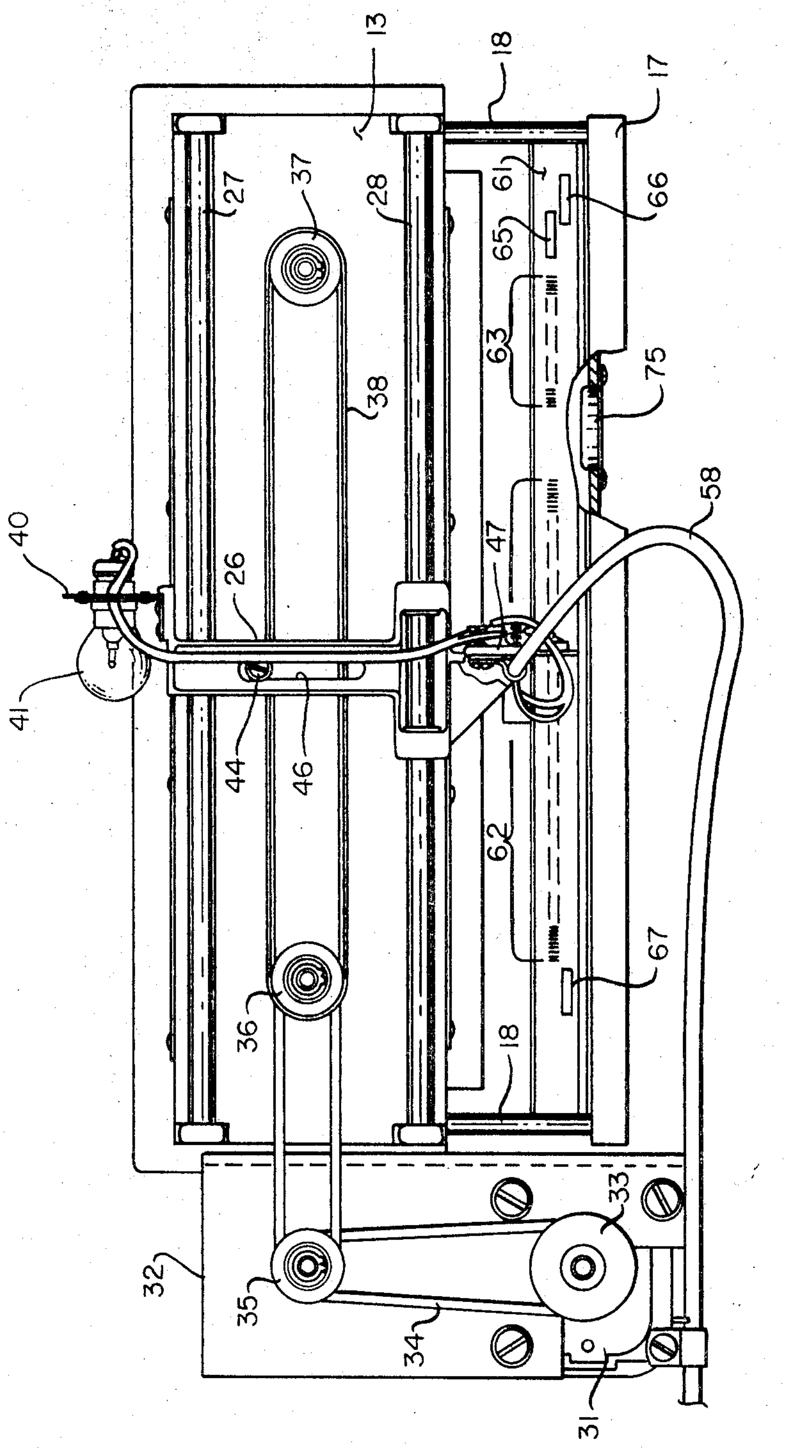
FIG. 2 is a rear view of the apparatus shown in FIG. 1.
Figure 3:
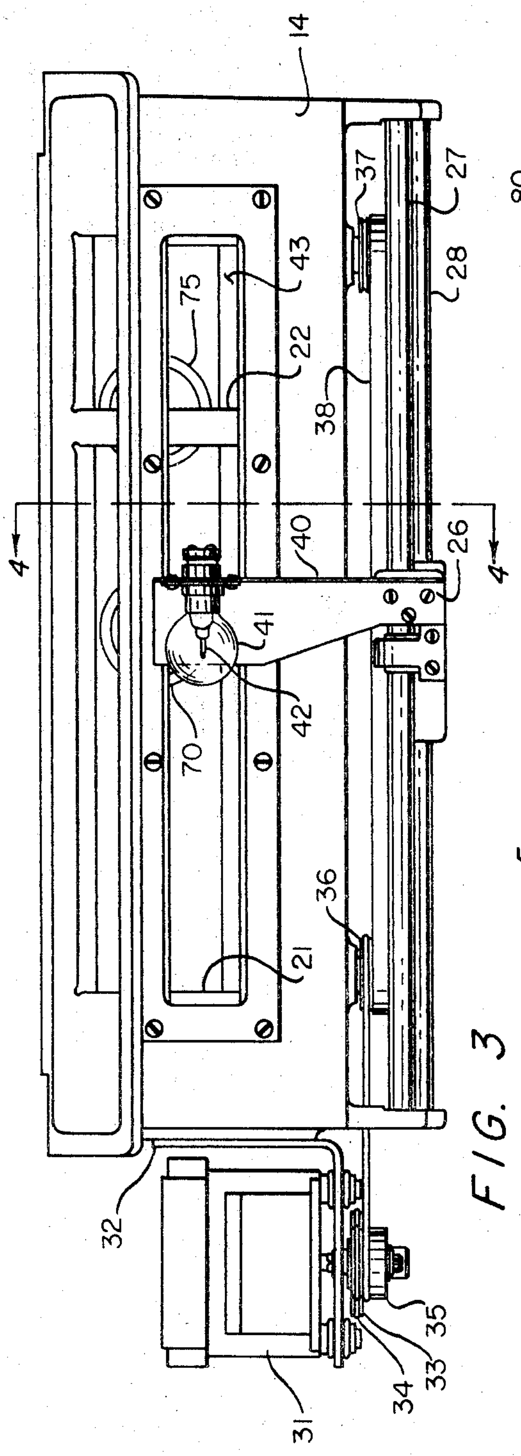
FIG. 3 is a plan view of the apparatus shown in FIG. 1.

A carriage 26, FIGS. 2 and 3, slidably mounted on rods 27 and 28 affixed to backplate 13, carries mounting brackets for a light source and photoelectric devices which are moved in unison to scan a card or document. The drive for the carriage includes a drive motor 31 supported on bracket 32 secured to the edge of backplate 13. The motor pulley 33 which receives belt 34 drives an idler pulley 35 disposed on bracket 32 which in turn is belt coupled to a pulley 36 mounted on one end of backplate 13. On the other end of the backplate, a pulley 37 is mounted for rotation and a flat belt 38 couples pulley 36 to pulley 37.

As will be presently described in detail, pulley 36 in conjunction with flat belt 38 serves to drive the carriage 26 for movement back and forth along the apparatus.

A bracket 40 attached to carriage 26 carries a light source 41 which is associated with a slit 42 $0 (see FIG. 5) in the bracket. A glass window 43 is mounted in top plate 14 and allows rays of light to be directed through the slit toward cards inserted in openings 21 and 22. Carriage 26 is driven by flat belt 38 by means of a stud 44 (FIG. 2) affixed to the belt, the stud riding or reciprocating in vertical groove or slot 46 located in a vertical member of the carriage. Unidirectional movement of belt 38 thus produces a back and forth movement of the carriage with a smooth reversal of its direction since the reversal is caused by the stud 44 passing through a point of zero lateral acceleration.

A second bracket 47 attached to carriage 26 (FIG. 2 and 4) extends beneath windows 21 and 22 and carries photoresponsive devices 48 on a dielectric arcuate subassembly **47*a*. The subassembly is so curved that light rays indicated by radial lines 51 coincide with the sensitive axes of the photoresponsive devices 48. Spacing of the photoresponsive devices are such that the radial lines 51, as they pass through a card placed on the top surface of transparent window 23**, intersect the centers of any holes punched in the appropriate card rows.

Figure 5:
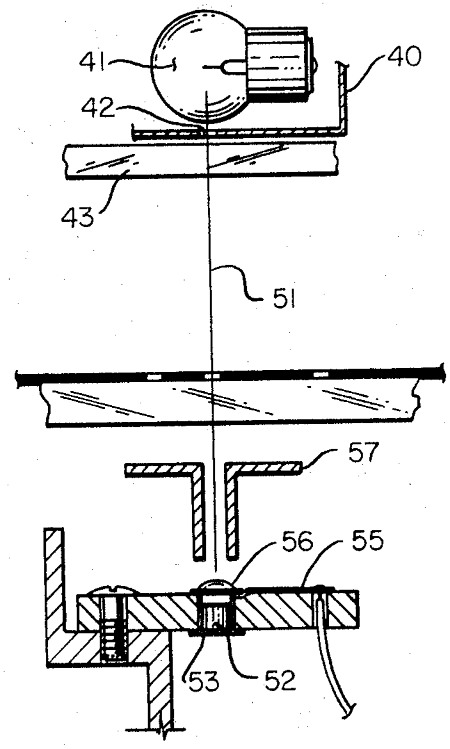
FIG. 5 is a cross-sectional view taken along the line 5–5 of FIG. 4.

FIG. 5 shows a more detailed view of a photoresponsive device, which includes a photocell 52 which is attached to conductive leads 53 and 55. The light receiving portion has light rays directed into it by a lens 56. Each photoresponsive device preferably has a directional characteristic whereby the direction of sensitivity is generally along its axis. However, a shield 57, which is affixed to bracket 47, provides an even more limited field of view to thereby exclude extraneous light rays, except those originating from light source 41, and extending through holes in the card column being scanned. Appropriate electrical leads 58 (FIG. 2) are attached to the bracket assembly 47 and the respective photoresponsive device and light source 41.

Figure 4:
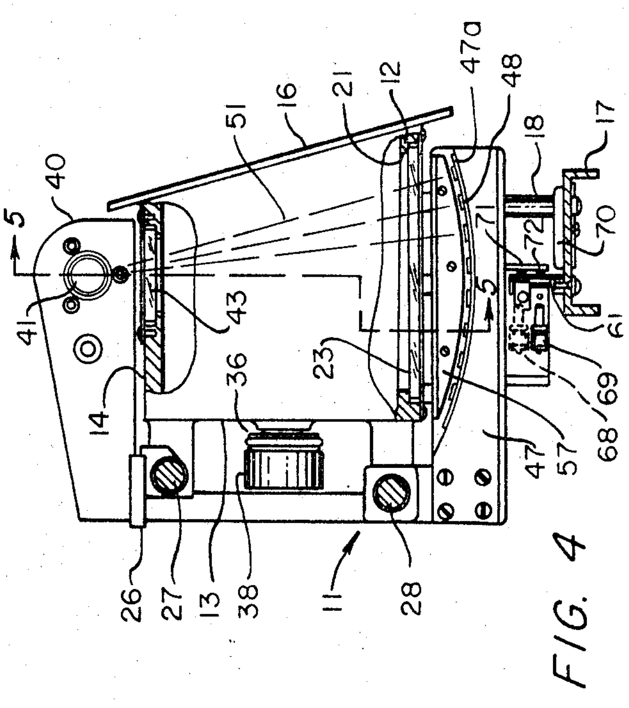
FIG. 4 is a cross-sectional view taken along the line 4–4 of FIG. 3.

Means are provided for generating signals indicative of the position of carriage 26. For this purpose a synchronizing strip 61 is mounted as best shown in FIG. 4 on U-shaped bracket 17 and includes two groups of vertical slits 62 and 63. In the first group are 80 slits which correspond to an 80 column card which would be placed in opening 21. In the second group are 22 slits which correspond in number and location to a 22 column card placed in opening 22. In addition, the synchronizing strip 61 contains on the right-hand end horizontal slots 65 and 66 which indicate the starting or standby position of the scanning device, and on the left-hand end a slot 67 which indicates the end of the active scan cycle. Electrical indications of the above slits and slots are provided by means of light sources 68 and 69 (FIG. 4) and associated photocells 71 and 72 which are mounted in opposed relationship with the synchronizing strip 61 between them on bracket 47. Thus, an electrical pulse is generated by photoresponsive device 71 each time the corresponding card column of the punch card being scanned is passed.

The control circuit for the scanning is very simple, requiring only a signal to start the motor and means responsive to the coincident sensing of slots 65 and 66 to stop the motor.

Means for indicating the presence or absence of a card in either opening 21 or 22 are provided by area photocells 70 and 75 (FIGS. 2 and 3) which are mounted in U-shaped bracket 17 in an offset relationship with respect to openings 21 and 22. The offset relationship provides for the reception of light from bulb 41 in its starting position over windows 23 and 24. The sensing of a certain amount of light over a predetermined threshold level indicates no card is present. Area type photocells are used to allow operation in the presence of some light due to the punched holes in the cards.

Figure 6:
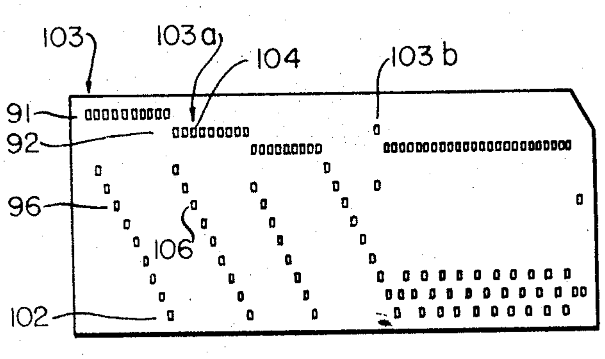
FIG. 6 shows a typical punched card.

A typical punched card is shown in FIG. 6. The card includes 12 horizontal rows, 91—102, and a plurality of vertical columns labeled 103. By way of example, the column shown as **103*a* provides a code character which is represented by holes 104 and 106** and might designate the character L. The card includes other code characters, as shown.

Figure 7:
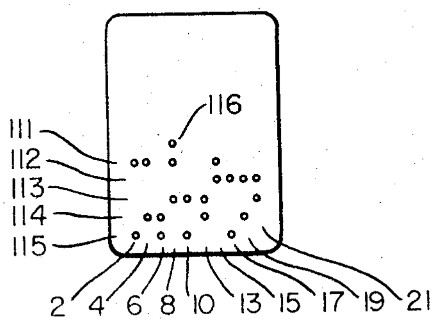
FIG. 7 shows a punched I.D. badge.

FIG. 7 shows a punched I.D. badge including 5 rows, 111—115 and 10 columns. The 5 columns of the left half of the card have been designated 2, 4, 6, 8, and 10, and those on the right side of the card 13, 15, 17, 19, and 21; these designations indicate the equivalent hollerith-type card columns.

An index hole 116 indicates to the card reader which side of the card is facing it, thus allowing for insertion of the card either side up by the operator. This type of card is inserted in opening 22. The specific arrangement of its columns provides for compatibility, in this reader, with hollerith coded cards.

A card is read in apparatus of the type described by inserting it in the opening 21 or 22, depending on the card size. The start signal is then generated and the light source 41 is energized and projects light through the associated slit 42 towards the card. Concurrently, the motor control circuit is energized, causing belt 38 to operate. The carriage, including the light source and photoresponsive devices, travels down the length of the card, passing each column in succession. The photoresponsive device adjacent to any punched hole is illuminated and generates a corresponding pulse. A parallel code pulse character then appears on the 12 wires associated with the rows. New characters may appear as the carriage passes each column in succession. The exact instant at which the photoresponsive devices are in proper alignment with the holes in each card column is defined by the pulses from the synchronizing strip.

Figure 8:
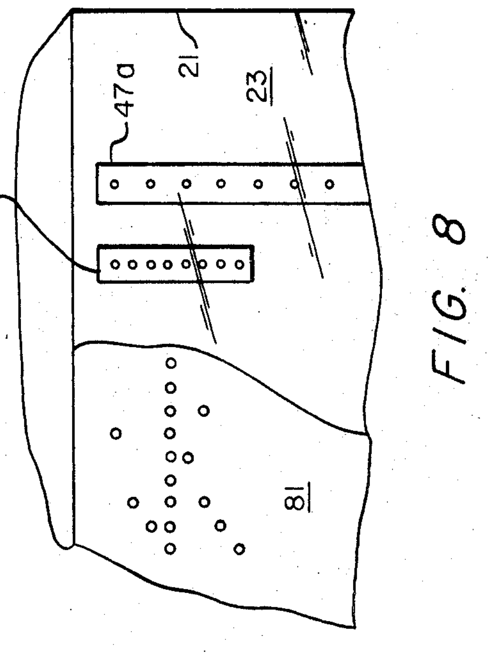
FIG. 8 is a plan view of an alternative embodiment for reading edge punched documents.

FIG. 8 illustrates an alternative embodiment in which an additional subassembly 80 of photoresponsive devices is added to bracket 47 in close proximity to subassembly **47*a*. This is for the purpose of reading edge punched documents. A typical document 81 is illustrated and includes a standard-type edge punch with nine possible columns. The sixth column is for the purpose of synchronization; therefore the lateral location of the document with respect to synchronizing strip 61** is not critical.

It is to be observed that because of the distance between the light and the photocells, the rays extending from the light to the photocells diverge at a moderately small angle. As a result, the vertical position of the card or document is not critical. Thus, even if the document is bent whereby it is spaced slightly above the window, the light rays will strike the appropriate photoresponsive devices. Thus, a mutilated or damaged card can be read by the apparatus of the present invention.

The reader of the present invention may also read types of documents other than punched cards such as a transparent card with opaque markings and hollerith-type mechanical card apparatus where holes are mechanically preset. The latter is termed a Data Cartridge (trademark) by I.B.M. Corporation.

Thus, there is provided a relatively simple, economical and reliable apparatus which is adapted to scan punched cards and documents and provide a multiline coded output signal which can then be employed to operate associated equipment such as computers, printers and the like. In addition, the photoresponsive devices and their associated moving means are disposed in a sealed chamber to prevent contamination by the ambient outside atmosphere.

I claim:

1. A document reader for reading documents or cards of the type in which coded information is represented by holes in columns and rows comprising means for receiving and locating said coded document or card in a fixed stationary location, a light source disposed on one side of said receiving means for projecting light towards the same, a plurality of photoresponsive devices disposed on the other side of said receiving means to receive the light from said source, said photoresponsive devices being spaced and directed whereby the line of sight between each of the photoresponsive devices and the source of light passes through a corresponding hole position in a column of a document or card placed in said positioning means, means for supporting said light source and said plurality of photoresponsive devices, means for moving in unison said light source and photoresponsive devices to scan across a stationary document placed in said receiving means, and means providing a signal for indicating the column position as said light source and photoresponsive devices are moved.

2. A document reader as in claim 1 wherein said column position indicating means includes a light and a photoresponsive device.

3. A document reader as in claim 2 wherein said light and photoresponsive means are associated with said means for moving said light source and photoresponsive means.

4. A document reader as in claim 1 wherein said document receiving means comprises a well the sides of which are adapted to receive and engage at least two edges of a document or card.

5. A document reader as in claim 1 wherein said light source, photoresponsive devices, and means for supporting and moving them in unison are disposed within a cabinet which is sealed from said means for receiving and locating said coded document or card and from the ambient atmosphere, said cabinet including windows through which light may pass from said light source through coded holes in said coded document or card to said photoresponsive devices.

6. A document reader as in claim 1 wherein light responsive means are provided for sensing the presence or absence of a card.

7. A document reader for reading documents or cards of the type in which coded information is represented by holes in columns and rows, comprising means for receiving and locating said coded document or card in a fixed stationary location, a light source disposed on one side of said receiving means for projecting light towards the same, a plurality of in-line photoresponsive devices disposed on the other side of said receiving means to receive light from said source, said photoresponsive devices being spaced and directed whereby the line of sight between the photoresponsive devices and the source of light passes through a hole position in a column of a document or card, means for carrying said light projecting and said photoresponsive means for movement in unison to scan across said document in said receiving means, motive means including a motor for moving said carrying means, control means for controlling energization of said motor whereby to cause movement of said carrying means through one cycle of operation in response to a start signal, and means providing a signal for indicating the column position being read as the carrying means is moved.